US011847431B2

(12) United States Patent
Picco et al.

(10) Patent No.: US 11,847,431 B2
(45) Date of Patent: Dec. 19, 2023

(54) AUTOMATIC CONTAINER SPECIFICATION FILE GENERATION FOR A CODEBASE

(71) Applicant: INTERNATIONAL BUSINESS MACHINES CORPORATION, Armonk, NY (US)

(72) Inventors: Gabriele Picco, Dublin (IE); Natalia Mulligan, Dublin (IE); Inge Lise Vejsbjerg, Dublin (IE); Thanh Lam Hoang, Maynooth (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/653,438

(22) Filed: Mar. 3, 2022

(65) Prior Publication Data

US 2023/0280981 A1 Sep. 7, 2023

(51) Int. Cl.
*G06F 8/10* (2018.01)

(52) U.S. Cl.
CPC ...................... *G06F 8/10* (2013.01)

(58) Field of Classification Search
CPC ........................................................ G06F 8/10
USPC ................................................. 717/102–121
See application file for complete search history.

(56) References Cited

U.S. PATENT DOCUMENTS

| 6,449,603 | B1* | 9/2002 | Hunter | G06F 18/2111 |
| | | | | 706/15 |
| 8,037,453 | B1* | 10/2011 | Zawadzki | G06F 8/71 |
| | | | | 717/124 |
| 8,521,664 | B1* | 8/2013 | Lin | G06N 5/04 |
| | | | | 706/12 |
| 8,522,212 | B1* | 8/2013 | Bhatnagar | G06F 11/3684 |
| | | | | 717/109 |
| 8,745,572 | B2* | 6/2014 | Zimmermann | G06F 8/75 |
| | | | | 717/113 |
| 10,244,034 | B2* | 3/2019 | Joshi | H04L 43/14 |
| 10,599,957 | B2* | 3/2020 | Walters | G06F 11/3688 |
| 10,664,766 | B2* | 5/2020 | Hammond | G06F 8/38 |
| 10,884,896 | B2* | 1/2021 | Agarwal | G06F 8/60 |
| 10,949,562 | B2* | 3/2021 | Bendory | G06F 8/433 |
| 11,061,650 | B2* | 7/2021 | Turek | G06F 40/00 |
| 11,074,107 | B1* | 7/2021 | Nandakumar | G06F 8/10 |
| 11,200,157 | B1* | 12/2021 | Mathew | G06F 11/3688 |
| 11,269,820 | B1* | 3/2022 | Mahowald | G06F 16/215 |
| 11,275,850 | B1* | 3/2022 | Brandwine | G06F 16/24564 |
| 11,315,039 | B1* | 4/2022 | Elprin | G06F 8/60 |

(Continued)

FOREIGN PATENT DOCUMENTS

| CN | 108920250 A | 11/2018 |
| CN | 111198744 A | 5/2020 |

(Continued)

OTHER PUBLICATIONS

Song et al , "Automatic Extraction of Web Data Records Containing User-Generated Content", ACM, pp. 39-48 (Year: 2010).*

(Continued)

*Primary Examiner* — Anil Khatri
(74) *Attorney, Agent, or Firm* — Griffiths & Seaton PLLC

(57) ABSTRACT

Embodiments for providing an enhanced codebase in a computing environment by a processor. One or more container specification files may be automatically generated for a codebase based on one or more extracted attribute names and values.

14 Claims, 10 Drawing Sheets

(56) References Cited

U.S. PATENT DOCUMENTS

| | | | |
|---|---|---|---|
| 11,573,770 B2* | 2/2023 | Karri | ................ G06F 8/10 |
| 2020/0117576 A1 | 4/2020 | Karukuri et al. | |
| 2021/0096854 A1 | 4/2021 | Chapman et al. | |

FOREIGN PATENT DOCUMENTS

| | | |
|---|---|---|
| CN | 111831323 A | 10/2020 |
| CN | 111880832 A | 11/2020 |
| CN | 112965786 A | 6/2021 |

OTHER PUBLICATIONS

Henkel et al, "Discovering Documentation for Java Container Classes" IEEE, pp. 526-543 (Year: 2007).*

Lu et al, "An Empirical Case Study on the Temporary File Smell in Dockerfiles", IEEE, pp. 1-10 (Year: 2019).*

Aziz et al, "A Study on Gradient Boosting Algorithms for Development of AI Monitoring and Prediction Systems", IEEE, pp. 1-6 (Year : 2020).*

Trisovic et al, "Advancing Computational Reproducibility in the Dataverse Data Repository Platform", ACM, pp. 15-20 (Year: 2020).*

Gharibi et al, ModelKB: Towards Automated Management of the Modeling Lifecycle in Deep Learning:, IEEE, pp. 28-34 (Year: 2019).*

* cited by examiner

```
1  FROM mcr.acme1234.com/dotnet/core/sdk:3.0.100-preview AS builder
2
3  WORKDIR /src
4  COPY src/DotNetConf2019.csproj .
5  RUN dotnet restore
6
7  COPY src/ .
8  RUN dotnet publish -c Release -o /out DotNetConf2019.csproj
9
10 #app image
11 FROM mcr.acme1234.com/dotnet/core/runtime:3.0.0-preview9
12
13 WORKDIR /app
14 ENTRYPOINT ["dotnet", "DotNetConf2019.dll"]
15 ENV DotNetBot:Message="docker4theEdge!"
16
17 COPY --from=builder /out/ .
```

810

Docker file 810 demonstrates attributes detected as:
- WORKDIR: /src
- WORKDIR: /app,
- FROM: mcr.acme1234.com/dotnet/core/sdk
- mcr.acme1234.com/dotnet/core/sdk:3.0.100-preview9
- FROM: mcr.acme1234.com/dotnet/core/runtime
- mcr.acme1234.com/dotnet/core/runtime:3.0.0-preview9

CODEBASE REPOSITORY

| | | |
|---|---|---|
| src | | Add demo app for .NET Conf 2019 |
| .gitignore | Initial commit | |
| Dockerfile | | Add demo app for .NET Conf 2019 |
| LICENSE | Initial commit | |
| README.md | | Add demo app for .NET Conf 2019 |

AUTOMATIC CONTAINER SPECIFICATION FILE GENERATION FOR A CODEBASE

BACKGROUND OF THE INVENTION

Field of the Invention

The present invention relates in general to computing systems, and more particularly, to various embodiments for automatically generating a container specification file for a codebase by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for providing an enhanced codebase in a computing environment, by one or more processors, is depicted. One or more container specification files may be automatically generated for a codebase based on one or more extracted attribute names and values.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8 is a diagram depicting attribute extraction operations of pseudocode in a computing environment according to an embodiment of the present invention.

DETAILED DESCRIPTION OF THE DRAWINGS

Figure 1:
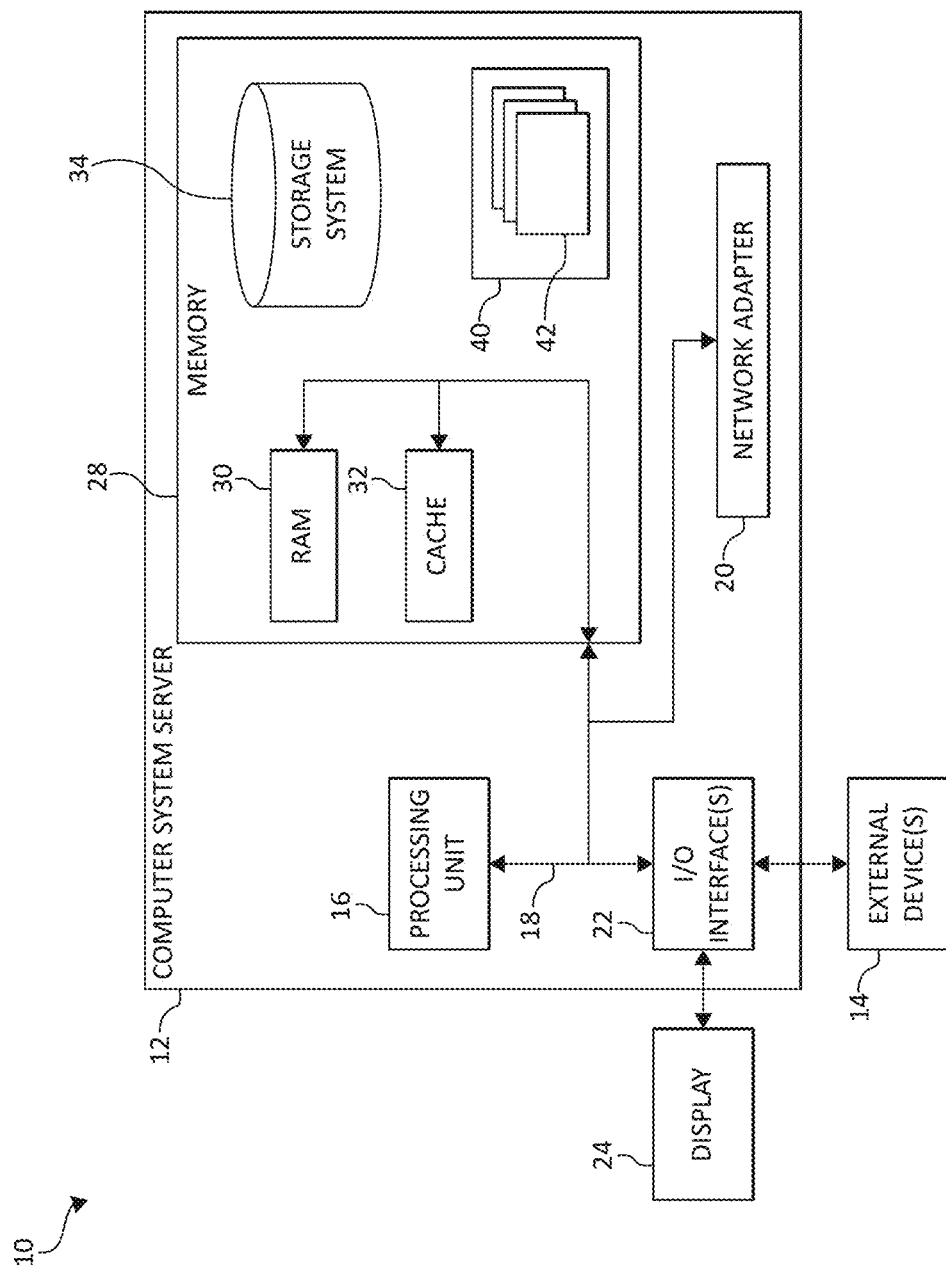
FIG. 1 is a block diagram depicting an exemplary cloud computing node according to an embodiment of the present invention.

Over the last decade, software development and deployment is increasingly managed in distributed and shared computing environments, including but not limited to, cloud computing environments. In the field of software development and deployment, container-based virtualization has been largely adapted where the "containers" provide a layer of abstraction and virtualization for a running application. Container technology is being utilized more and more in production environments and may be configured automatically or manually.

Currently, deploying a codebase (e.g., a set of code) of an existing application to a containerized cloud platform can be a complicated process with many manual steps. Making decisions about selecting an ideal framework and configuration can be difficult and time consuming, especially for inexperienced users. The existing process can cause an increased delay times to deployment while also presenting problems with choosing invalid configurations and performance tuning issues down the line if users are choosing less than optimal configurations.

Thus, a need exists for application modernization including containerization is for hybrid cloud strategy. Also, a need exists for eliminating or reducing the barriers to adopting containerization within a cloud computing environment, which will also increase efficiency while reducing costs or maintaining legacy applications.

Accordingly, the present invention provides for an enhanced codebase in a computing environment. One or more container specification files may be automatically generated for a codebase based on one or more extracted attribute names and values.

In some implementations, a codebase is used as input to a system which then outputs a container specification file suitable to containerize the application. Additionally, the present invention enables a user to provide feedback, adjust, modify and/or amend the generated file for future training rounds.

In some implementations, the present invention provides for combining a generative model with an "attribute extraction" process for the automatic generation of container specification file for a given codebase. One or more data repositories (e.g., public repositories such as, for example, all software project (e.g., Github and Gitlab) repositories that contain a Dockerfile) may be used to 1) learn embeddings and train a generative model that generates container specification files, and/or 2) learn embeddings and train a model to predict container specification attribute values used for refinement.

In other various implementations, the present invention provides for automatically generate an intermediate container specification candidate file given a codebase. The present invention may detect/extract attributes name and value from container specification files, where the input codebase is filtered, summarized and/or embedded. The present invention may predict attributes values for the intermediate container specification file and refine intermediate container specification file with the values predicted. A user interface may be enabled to allow users (e.g., subject matter experts) to amend the container specification file and where users' corrections are used to refine the system. The present invention may collect and prepare training data from public repositories.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
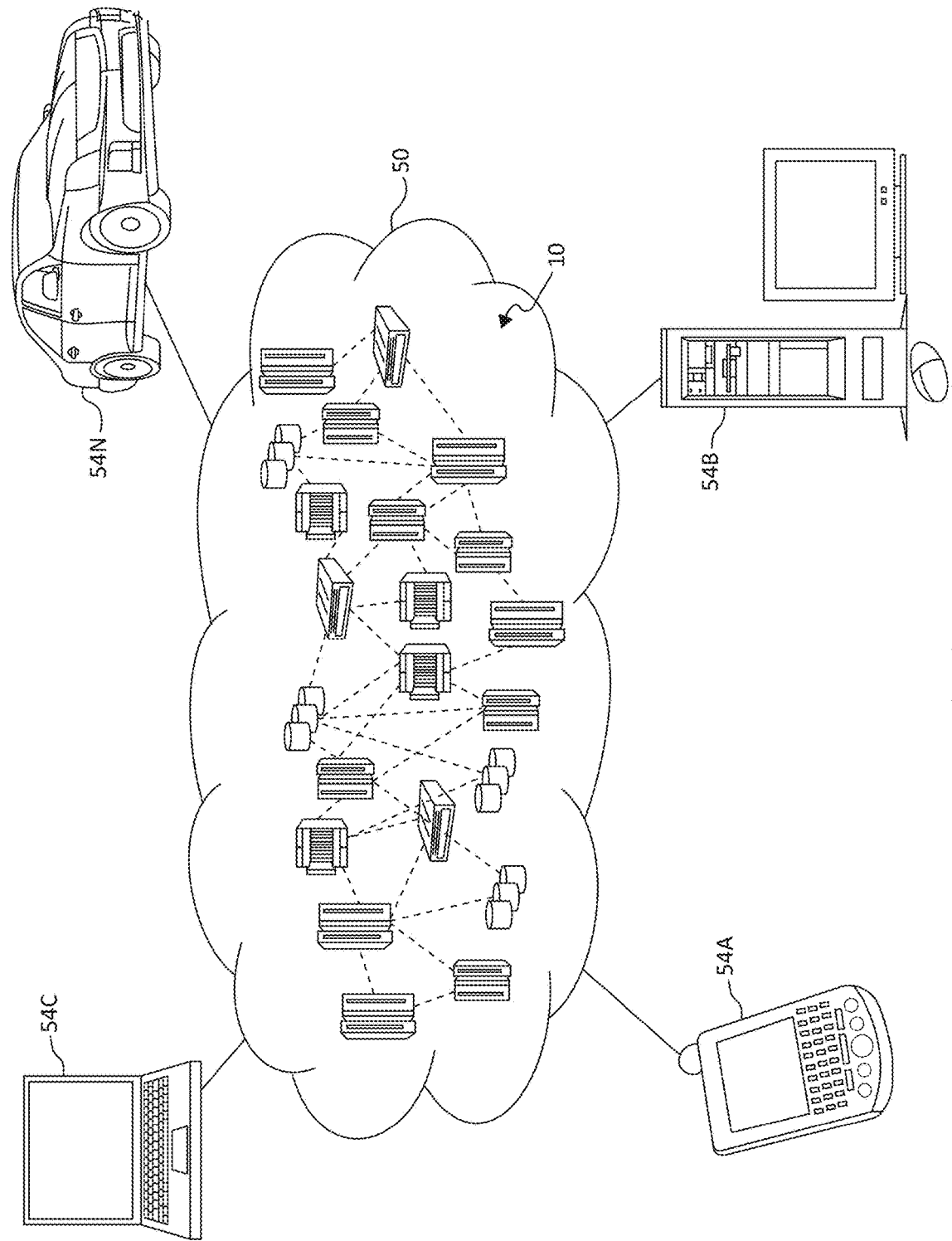
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
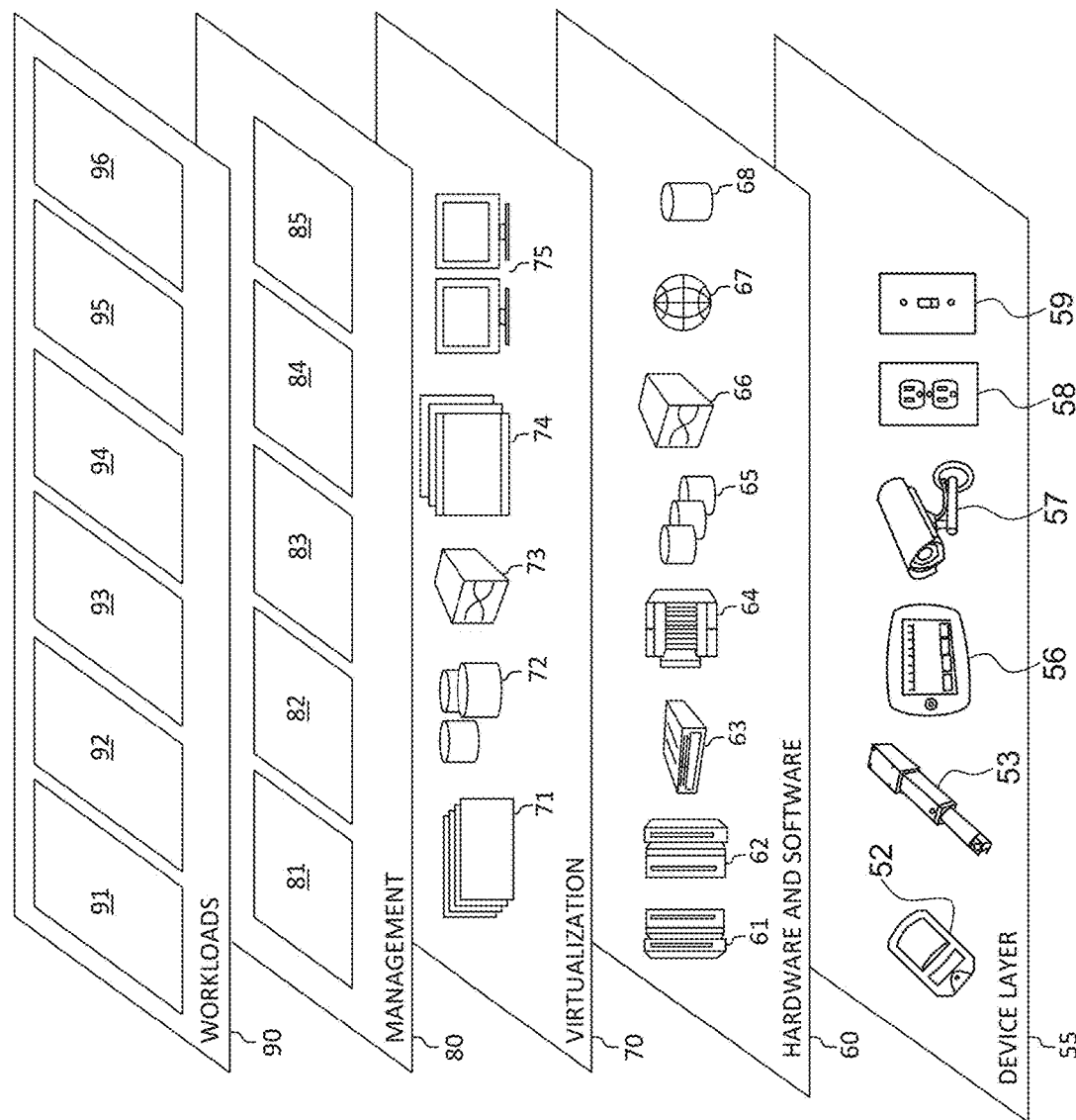
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided.

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automatically generating a container specification file for a codebase. In addition, workloads and functions 96 for automatically generating a container specification file for a codebase may include such operations as data analytics, data analysis, and as will be further described, notification functionality. One of ordinary skill in the art will appreciate that the workloads and functions 96 for automatically generating a container specification file for a codebase may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
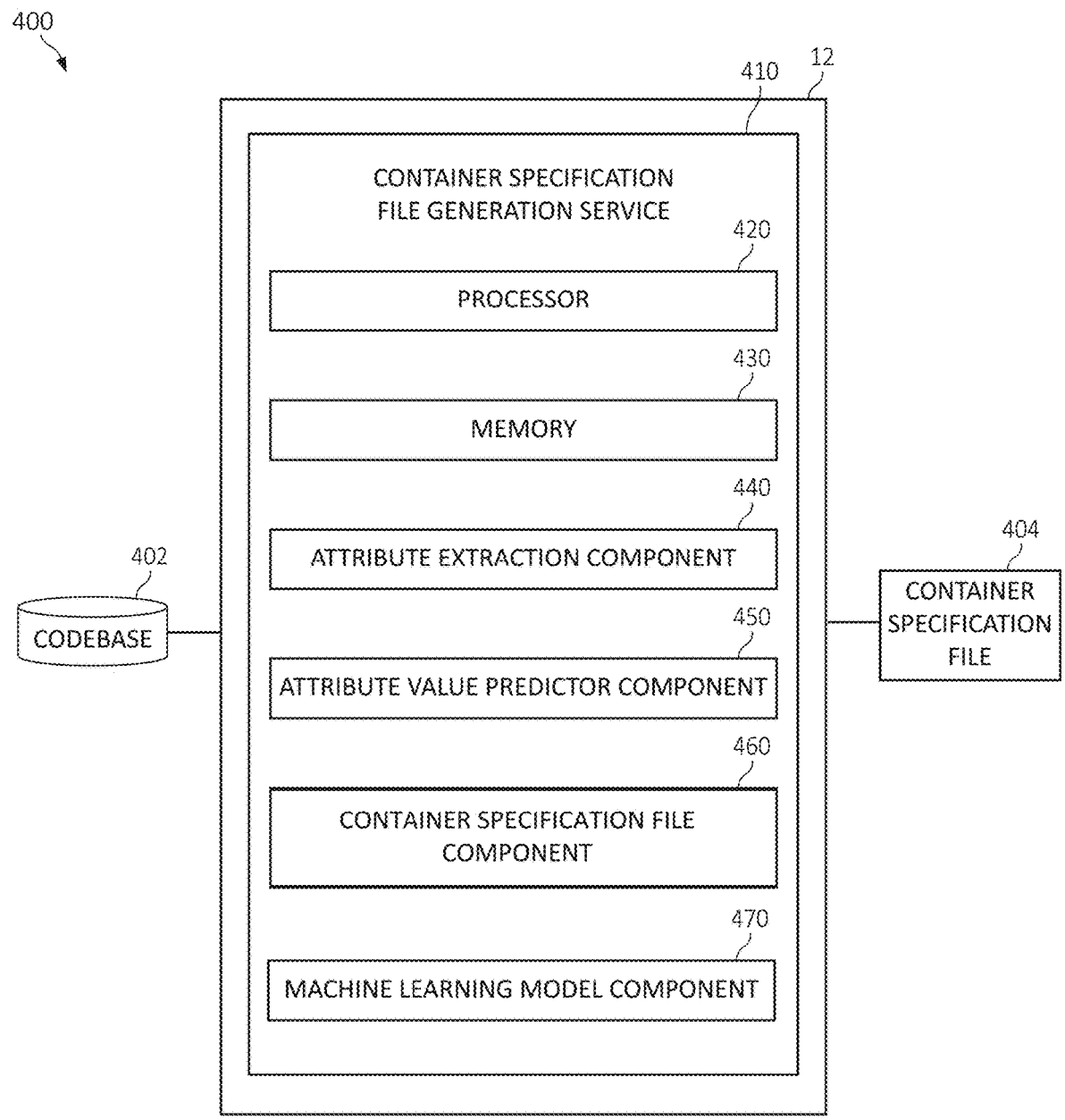
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. Repetitive description of like elements employed in other embodiments described herein is omitted for sake of brevity.

A container specification file generation service 410 is shown, incorporating processing unit ("processor") 420 to perform various computational, data processing and other functionality in accordance with various aspects of the present invention. The container specification file generation service 410 may be provided by the computer system/server 12 of FIG. 1. The processing unit 420 may be in communication with memory 430. The container specification file generation service 410 may include an attribute extraction component 440, an attribute value predictor component 450, a container specification file component 460, and a machine learning model component 470.

As one of ordinary skill in the art will appreciate, the depiction of the various functional units in container specification file generation service 410 is for purposes of illustration, as the functional units may be located within the container specification file generation service 410 or elsewhere within and/or between distributed computing components.

In general, by way of example only, the container specification file generation service 410 may receive as input a codebase 410. The container specification file generation service 410, using the attribute extraction component 440, the attribute value predictor component 450, the container specification file component 460, and the machine learning model component 470 may automatically generate one or more intermediate container specification files for the codebase from one or more available data repositories.

The container specification file generation service 410, using the attribute extraction component 440, the attribute value predictor component 450, the container specification file component 460, and the machine learning model component 470 may identify and extract attribute names and values from one or more intermediate container specification files.

The container specification file generation service 410, using the attribute extraction component 440, the attribute value predictor component 450, the container specification file component 460, and the machine learning model component 470 may predict one or more attribute values for one or more intermediate container specification files.

In some implementations, the attribute value predictor component 450 may takes as input a summarized version of the codebase 402 and a set of attribute names extracted from the generated container specification file and suggests the most optimal values for these attributes. In one embodiment, the attribute value predictor component 450 may be implemented using machine learning operations. A machine learning model can be trained using the machine learning model component 470 to predict attribute values using input codebase (codebase embedding) and attribute names. In the run time, for each attribute detected by the Attribute extraction component 440, the model suggests a list of attributes values with the corresponding confidence scores.

Also, it should be noted that the container specification file component 460 may create a refined version of the container specification file 404 by replacing values of the attributes in container specification candidate file with the ones predicted by the attribute value predictor component 450 (e.g., a codebase attribute value predictor).

The container specification file component 460 may take as input a container specification candidate file, extracted attribute names, and predicted attribute values. The container specification file component 460 may then generate a container specification file 404. The attribute values in the generated container specification candidate file 404 are populated with "most frequent" values, learned from a training corpus of the machine learning model component 470. Such values include, for example, "default" or "latest." A decision to replace values with the ones predicted by the attribute value predictor component 450 (e.g., a codebase attribute value predictor) may be based on a confidence threshold, otherwise the value generated by the container specification file component 460 is left unchanged. The refined version of the container specification file 404 may be presented to a user (e.g., user 640 of FIG. 6A-6B). Feedback, from a user and/or a machine learning operations, may be added to a training corpus of the and completes a human-in-the-loop cycle.

The container specification file generation service 410, using the attribute extraction component 440, the attribute value predictor component 450, the container specification file component 460, and the machine learning model component 470 may refine one or more intermediate container specification files using one or more predicted attribute values.

The container specification file generation service 410, using the attribute extraction component 440, the attribute value predictor component 450, the container specification file component 460, and the machine learning model component 470 may receive feedback data to correct or amend the one or more container specification files.

The container specification file generation service 410, using the attribute extraction component 440, the attribute value predictor component 450, the container specification file component 460, and the machine learning model component 470 may collect training data to train intermediate container specification files from one or more available data repositories.

In some implementations, the machine learning model component 470 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
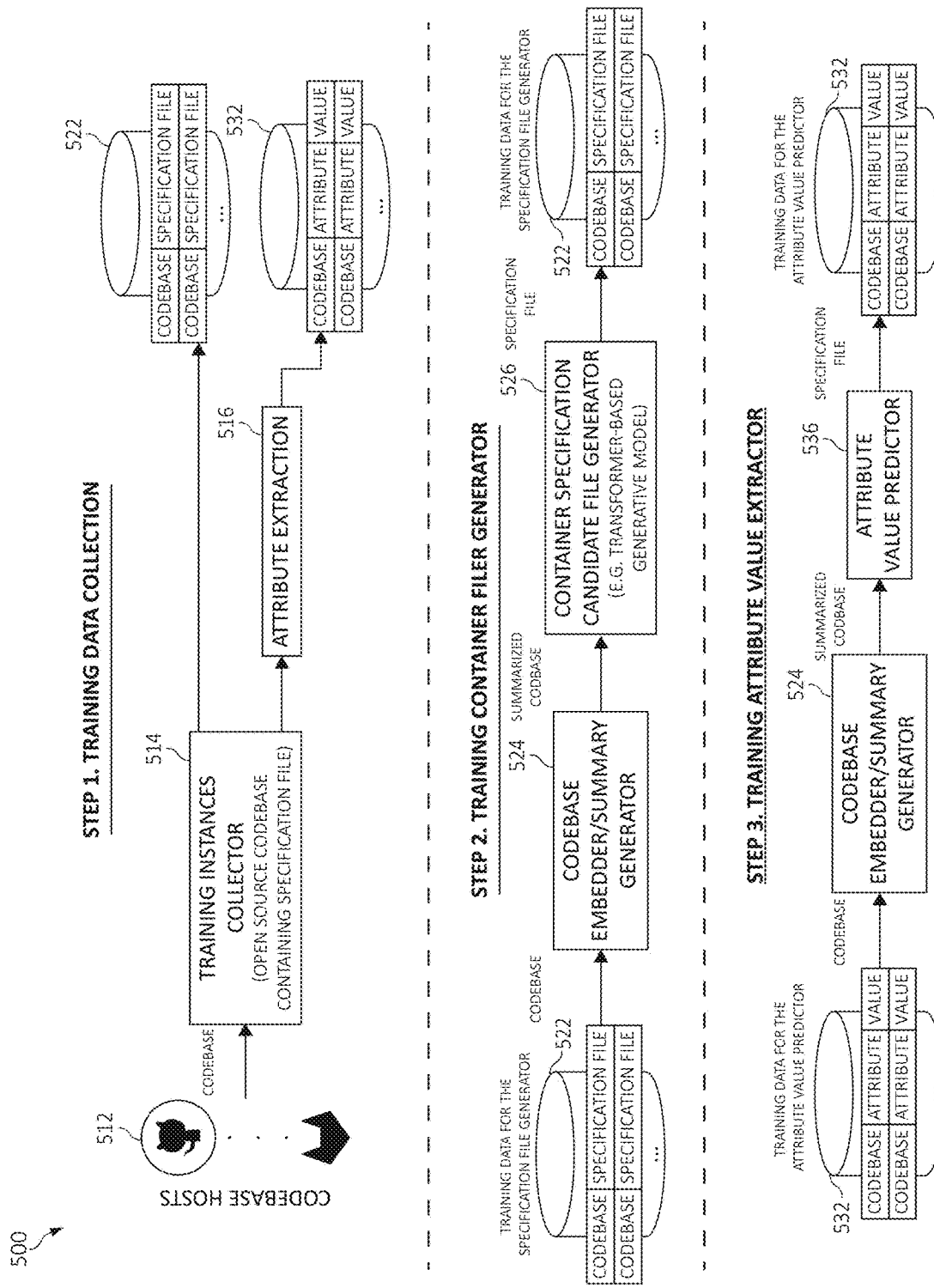
FIG. 5 is a block diagram depicting for training models for automatically generate a container specification file for a codebase according to an embodiment of the present invention.

Turning now to FIG. 5, a block diagram 500 depicts exemplary operations for automatically generating a container specification file for a codebase. In one aspect, one or more of the components, modules, services, applications, and/or functions described in FIGS. 1-4 may be used in FIG. 5. Repetitive description of like elements employed in other embodiments described herein is omitted for sake of brevity.

Starting in a first step, training data may be collected. In block 512, inputs such as, for a codebase may be provided from a codebase host 512 and provided to a training instances collector 514 (e.g., an opensource codebase containing specification file). The data may be processed and analyzed, and one or more attributes may be extracted (e.g., attribute extraction), as in block 516, as training data for an attribute value predictor 532. Simultaneously, training data may be sent to a specification file generator 522 have the codebase and the specification file.

In a second step, training container specification file may be generated. Using the training data from the specification file generator 522, a codebase may be provided to a codebase embedder/summary generator, as in block 524. The codebase embedder/summary generator 524 may provide a summarized codebase to a container specification candidate file generator 526 (e.g., transformer-based generative model). The container specification candidate file generator 526 may provide a specification file (e.g., training data) to the specification file generator 522.

In a third step, training data for the attribute value predictor 532 may be used. Using the training data for the attribute value predictor 532, a codebase may be provided to a codebase embedder/summary generator 524. The codebase embedder/summary generator 524 may provide a summarized codebase to the attribute value predictor 532 (e.g., training data for the attribute value predictor 532).

Figure 6A:
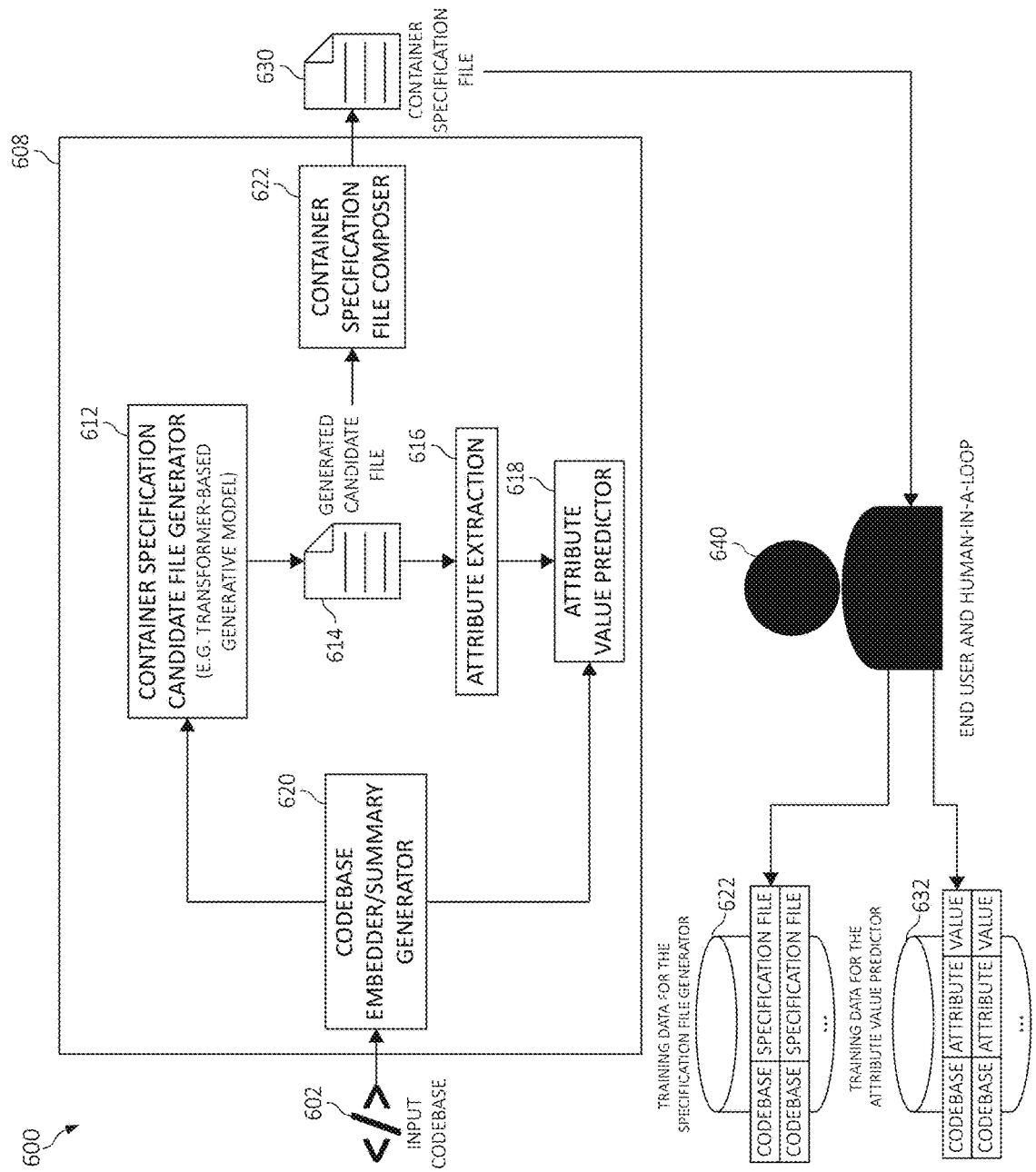
FIG. 6A is an additional block diagram depicting operations for training a universal model for automatically generate a container specification file for a codebase in a computing environment according to an embodiment of the present invention.
Figure 6B:
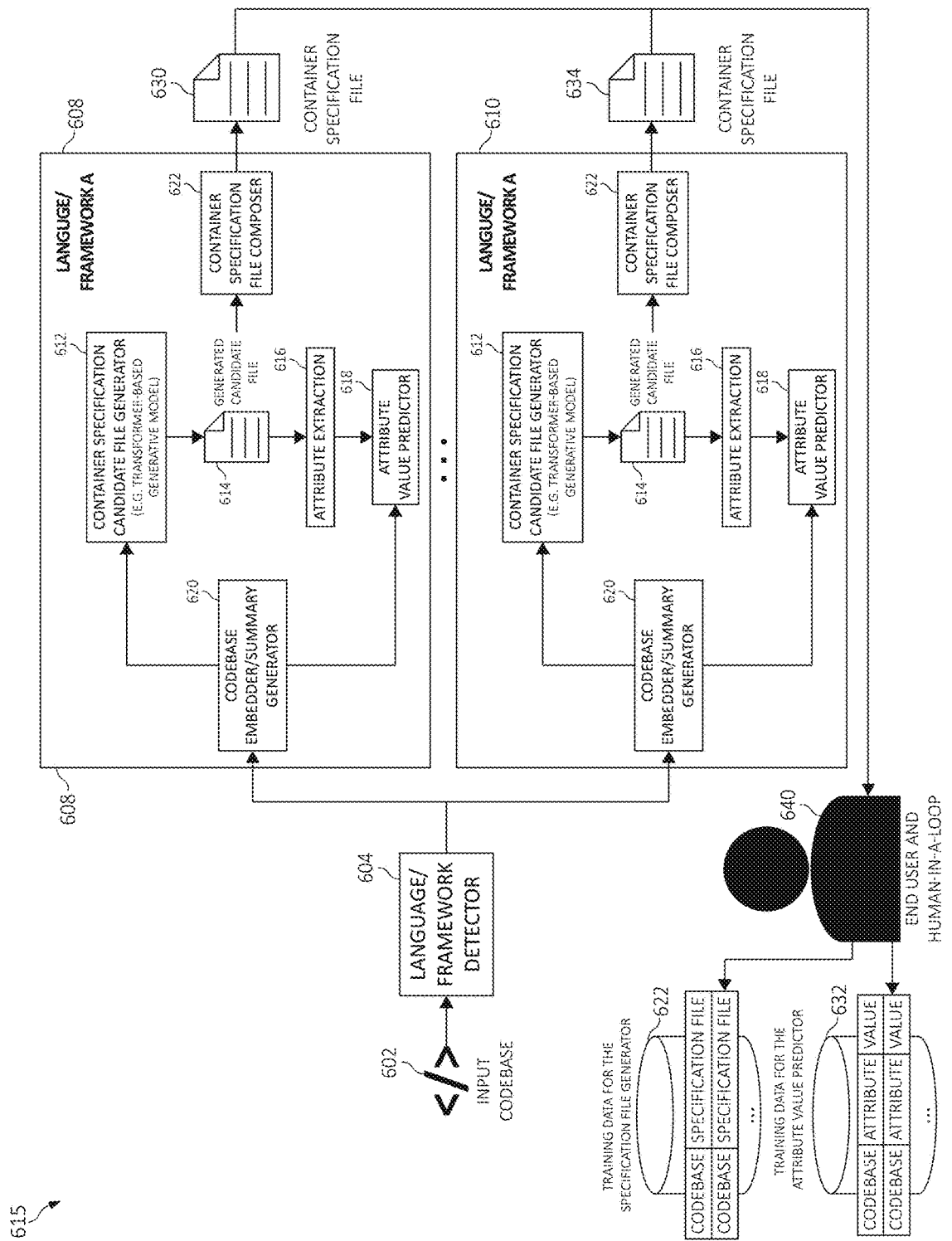
FIG. 6B is an additional block diagram depicting operations for training a specific model for automatically generate a container specification file for a codebase in a computing environment according to an embodiment of the present invention.

For further explanation, FIG. 6A is a block diagram 600 depicting operations for training a universal model (e.g., one-size fits all generator model) for automatically generate a container specification file for a codebase. FIG. 6B is an additional block diagram 615 depicting operations for training a specific model (e.g., a generator model for each type of computing language or framework) for automatically generate a container specification file for a codebase. In one aspect, one or more of the components, modules, services, applications, and/or functions described in FIGS. 1-5 may be used in FIGS. 6A-6B. Repetitive description of like elements employed in other embodiments described herein is omitted for sake of brevity.

As a preliminary matter, for training operations for both FIG. 6A and FIG. 6B, the following operations may be performed. First, training data may be collected and prepared. The training instances collector (e.g., the container specification file component 460 of FIG. 4) may collect training data containing a codebase with available container specification file from one or more public repositories (e.g., all Github and Gitlab repositories that contain a Dockerfile). The attribute extraction component (e.g., attribute extraction component 440 of FIG. 4) may extract attribute-value pairs from the container specification files, collected by the training instances collector (e.g., the container specification file component 460 of FIG. 4). Optionally, one or more attribute values of the container specification files may be replaced with the most frequent values observed in the codebases collected (e.g., replacing "FROM node:13" with "FROM node:latest").

Next, two sets of training data are formed to train a container specification candidate file generator (e.g., the container specification candidate file generator 526 of FIG. 5) and codebase attribute value predictor (e.g., the attribute value predictor component 450 or the attribute value predictor 536 of FIG. 5).

Second, the container specification candidate file generator (e.g., the container specification candidate file generator 526 of FIG. 5) may be trained. The input codebase from the training dataset may be filtered, embedded and summarized in the codebase embedder/summary generator component (e.g., the codebase embedder/summary generator component 524).

The container specification candidate file generator (e.g., the container specification candidate file generator 526 of FIG. 5) is trained to learn to generate a container specification file from the embedding of the codebase.

Third, the codebase attribute value predictor may be trained. The input codebase from the training dataset may be filtered, embedded and summarized in the codebase embedder/summary generator component (e.g., the codebase embedder/summary generator component 524). The codebase attribute value predictor (e.g., the attribute value predictor component 450 or the attribute value predictor 536 of FIG. 5) may be trained to learn to predict attributes value from the embedding of the codebase.

In some implementations, for a model per language or framework, training data may be split between languages and framework to be supported by the system. For each component (e.g., the container specification candidate file generator (e.g., the container specification candidate file generator 526 of FIG. 5) codebase attribute value predictor (e.g., the attribute value predictor component 450 or the attribute value predictor 536 of FIG. 5)), a model is trained for each of the supported languages and systems.

Turning to FIG. 6A, the following steps may be executed for run time version of a universal model (e.g., one-size fits all generator model) for automatically generate a container specification file for a codebase.

Staring in block 620, input codebase 602 may be provide to a container specification file generation. The input codebase 602 is filtered, embedded and summarized in the codebase embedder/summary generator 620. The container specification candidate file generator 612 receives from the codebase embedder/summary generator 620, an embedded codebase, as input, and generates/outputs a container specification candidate file 614.

An attribute extraction component 616 (e.g., attribute extraction component 440 of FIG. 4) extracts one or more attribute names from a generated container specification candidate file 614. In the next step, a codebase attribute value predictor 618 (e.g., the attribute value predictor component 450 or the attribute value predictor 536 of FIG. 5) may predict one or more values for each attribute identified by the attribute extraction component 616 using the embedded codebase, from the codebase embedder/summary generator 620, as an additional input.

A container specification file composer 622 (e.g., container specification file generation service 410 of FIG. 4) may create a refined version of a container specification file by replacing values of the attributes with the values predicted by codebase attribute value predictor 618.

In a sixth step, a refined version of the container specification file 630 may be presented to a user 640. The user 640 may review and adjust, modify, and/or amend the container specification file 630. Applying Human-in-the-loop machine learning, the amended files may be added to a training corpus to refine the generator model of the training data 622 for the container specification candidate file generator 612 and the training data 632 for the attribute value predictor 618.

Turning to FIG. 6B, the following steps may be executed for run time version of specific model (e.g., a generator model for each type of computing language or framework) for automatically generate a container specification file for a codebase.

In some implementations, the input codebase 602 may be provide to passed through a language/framework detector component 604 to identify a language or framework of the input codebase 602 and pass the input codebase 602 to a branch of the system such as for example, system 608 (for computing language/framework such as, for example, JAVA) or system 610 (for computing language/framework B such as, for example, Python) trained for the specific language or framework that is identified by the language/framework detector component 604. It should be noted that the language/framework detector component 604 may identify language features (e.g., language, framework) of the input codebase 602 through a code static analysis. In another embodiment, a machine learning model can be trained to identify/predict the language or framework from a code snippet or codebase embedding.

Within either the system 608 or system 610, the input codebase 602 is filtered, embedded, and summarized in the codebase embedder/summary generator 620. The container specification candidate file generator 612 receives from the codebase embedder/summary generator 620, an embedded codebase, as input, and generates/outputs a container specification candidate file 614.

An attribute extraction component 616 (e.g., attribute extraction component 440 of FIG. 4) extracts one or more attribute names from a generated container specification candidate file 614. In the next step, a codebase attribute value predictor 618 (e.g., the attribute value predictor component 450 or the attribute value predictor 536 of FIG. 5) may predict one or more values for each attribute identified by the attribute extraction component 616 using the embedded codebase, from the codebase embedder/summary generator 620, as an additional input.

A container specification file composer 622 (e.g., container specification file generation service 410 of FIG. 4)

may create a refined version of a container specification file 630 (from system 608) or refined version of a container specification file 634 (from system 610) by replacing values of the attributes with the values predicted by codebase attribute value predictor 618.

In a next step, a refined version of the container specification file 630 or container specification file 634 may be presented to a user 640. The user 640 may review and adjust, modify, and/or amend the container specification file 630. Applying Human-in-the-loop machine learning, the amended files may be added to a training corpus to refine the generator model of the training data 622 for the container specification candidate file generator 612 and the training data 632 for the attribute value predictor 618.

Figure 7:
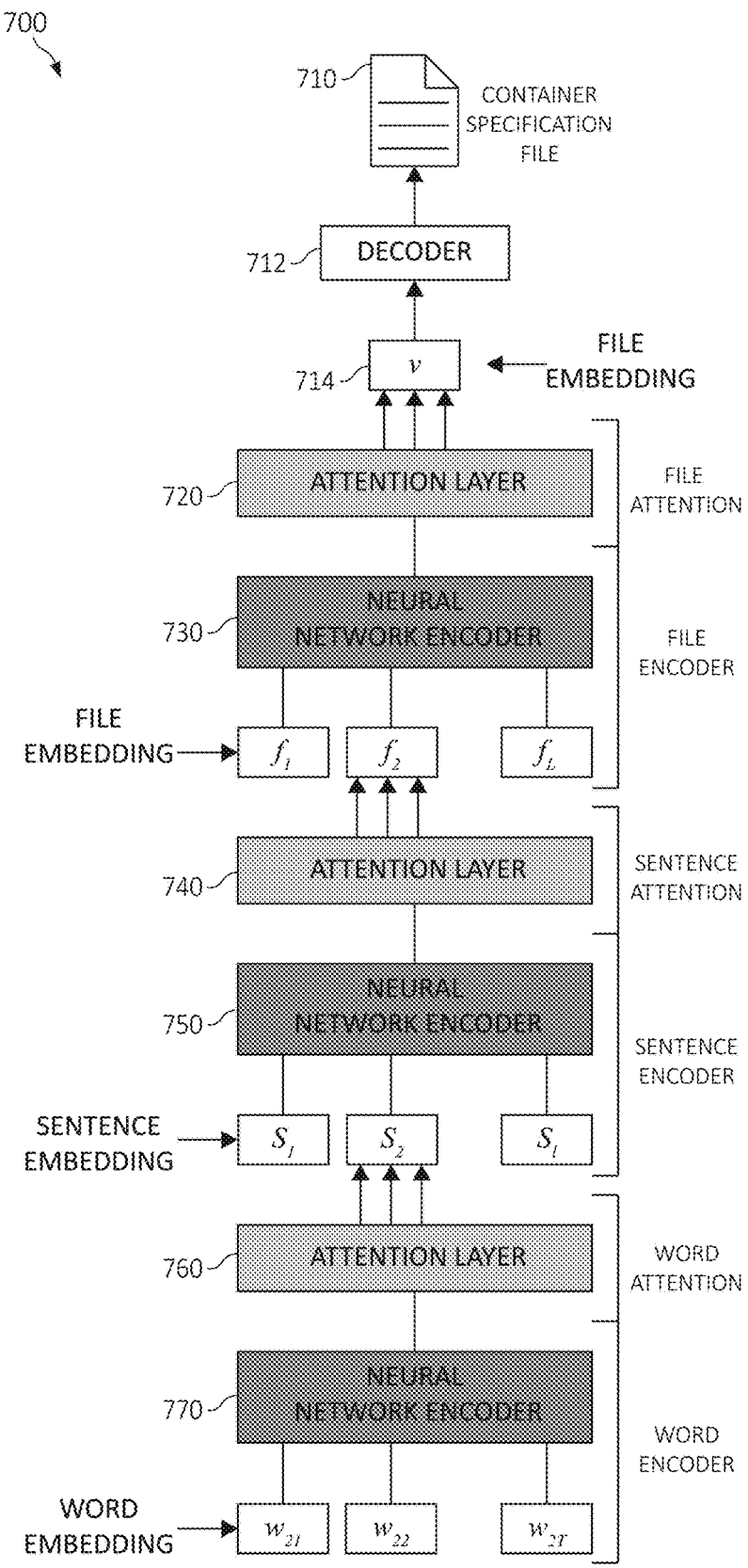
FIG. 7 is a block diagram depicting a codebase embedder/summary generator according to an embodiment of the present invention.

For further explanation, FIG. 7 is a block diagram depicting an additional exemplary operations using a codebase embedder/summary generator in a hierarchical attention network 700 in a computing environment according to an embodiment of the present invention. In one aspect, one or more of the components, modules, services, applications, and/or functions described in FIGS. 1-6A-6B may be used in FIG. 7. Repetitive description of like elements employed in other embodiments described herein is omitted for sake of brevity.

As a preliminary matter, an initial step in FIG. 7 may be executed to remove a container specification file and files not useful for inference, using a series of heuristics. As depicted, an embedding can be computed using a codebase embedder/summary generator in a hierarchical attention network 700 that builds embeddings such as, for example, building the embeddings from bottom to top (e.g., bottom-up operation) and training the network with a decoder 712 that generates the container specification file from the final codebase embedding.

In some implementations, starting from the bottom, one or more word embeddings (e.g., $w_{21}$, $w_{22}$,) may be aggregated using a neural network encoder, at block 770, and one or more attention layers, at block 760, in sentence embedding (e.g., $s_1$, $s_2$, $s_j$). The sentence embeddings (e.g., $s_1$, $s_2$, $s_j$) are then aggregated, in the same way (e.g., using the using a neural network encoder, at block 750, and one or more attention layers, at block 740, in file embeddings (e.g., $f_1$, $f_2$, $f_j$) The file embeddings (e.g., $f_1$, $f_2$, $f_j$) are then aggregated, in the same way (e.g., using the using a neural network encoder, at block 730, and one or more attention layers, at block 720, in codebase embeddings (v). A decoder 712 may be used to decode the codebase embeddings (v) and generate a container specification file 710.

A coefficient generator 720 may also receive input data (e.g., raw input data) and applies a library transforms (or transformations) to extract one or more data properties (e.g., Fourier, wavelet, Hadamard, Hough, etc.). Also, new features may be learned and extracted based on the functions and provided to a feature evaluator 730.

The feature evaluator 730 (e.g., random forest) may use an iterative approach that takes all generated features (or a subset of all generated features) from the equation generator 710 and the coefficient generator 720, together with all raw features (or a subset of all raw features) and evaluates the feature importance. Those identified as being "important" (based on some threshold) are retained as final machine learning model features 740 and then used as input to a machine learning model and provided.

For further explanation, FIG. 8 is a diagram 800 depicting attribute extraction operations of pseudocode in a computing environment according to an embodiment of the present invention. In one aspect, one or more of the components, modules, services, applications, and/or functions described in FIGS. 1-7 may be used in FIG. 8. Repetitive description of like elements employed in other embodiments described herein is omitted for sake of brevity.

In some implementations, for preparing training data, one or more codebases may be collected from public repository hosts (e.g., Github or Gitlab) that contain a container specification file (e.g., Dockerfile 810). The data is obtained using an application programming interface ("API") of the codebases' hosts or via web scraping. More than one training instance can be extracted from a repository 820 of the public repository host. For example, all the commits in which the Dockerfile 810 has been modified may be identified and a snapshot of the codebase at that point may be collected from the history (e.g., git history).

For example, and attribute extraction component (e.g., attribute extraction component of FIG. 4 or FIG. 5) may extract attribute names from the generated container specification candidate file (e.g., the Dockerfile 810). The attribute extraction component is expected to extract from the container specification file (e.g., the Dockerfile 810) attributes such as, for example, a library name, version, workdir, port number etc. The example of a Dockerfile 810 demonstrates attributes the attribute extraction component should detect may be, for example attributes:

WORKDIR: /src
WORKDIR: /app,
FROM: mcr.acme.com/dotnet/core/sdk
mcr.acme.com/dotnet/core/sdk:3.0.100-preview9.
FROM: mcr.acme.com/dotnet/core/runtime
mcr.microsoft.com/dotnet/core/runtime:3.0.0-preview9.

In one embodiment the attribute extraction component can be implemented as a decision support system (e.g., knowledge-based system built using container description ontology). In another embodiment the attribute extraction component can be implemented as a rule-based system using pattern matching, for example using regex.

Figure 9:
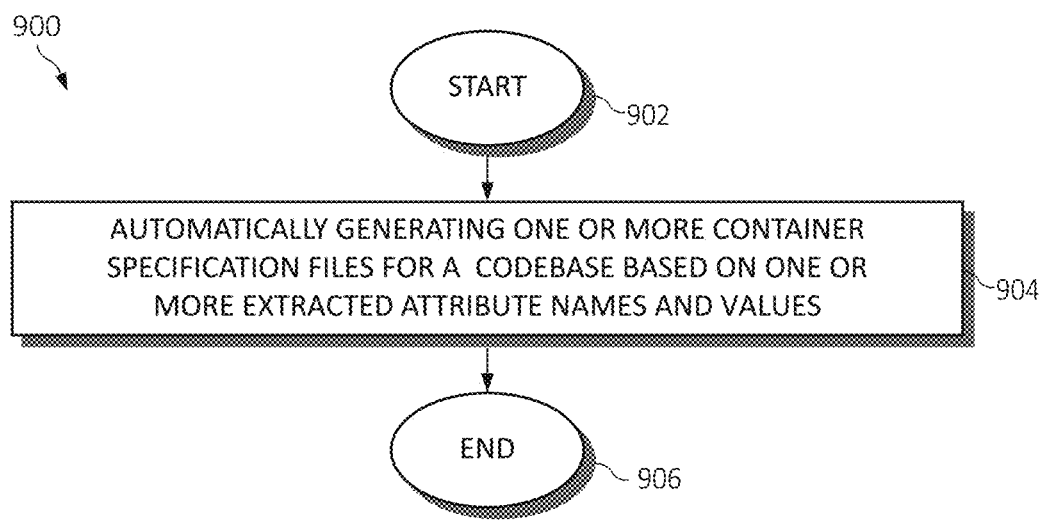
FIG. 9 is a flowchart diagram depicting an additional exemplary method for automatically generating a container specification file for a codebase in a computing environment according to an embodiment of the present invention.

FIG. 9 is a flowchart diagram depicting an exemplary method for providing an enhanced codebase in a computing environment. In one aspect, each of the devices, components, modules, operations, and/or functions described in FIGS. 1-8 also may apply or perform one or more operations or actions of FIG. 9. The functionality 900 may be implemented as a method executed as instructions on a machine, where the instructions are included on at least one computer readable medium or one non-transitory machine-readable storage medium. The functionality 900 may start in block 902.

One or more container specification files may be automatically generated for a codebase based on one or more extracted attribute names and values, as in block 904. In one aspect, the functionality 900 may end, as in block 906.

In one aspect, in conjunction with and/or as part of at least one block of FIG. 9, the operations of method 900 may include each of the following. The operations of method 900 may automatically generate one or more intermediate container specification files for the codebase from one or more available data repositories. The operations of method 900 may identify and extract attribute names and values from one or more intermediate container specification files. The operations of method 900 may predict one or more attribute values for one or more intermediate container specification files. The operations of method 900 may refine one or more intermediate container specification files using one or more predicted attribute values. The operations of method 900 may receive feedback data to correct or amend the one or more container specification files. The operations of method 900 may collect training data to train intermediate container specification files from one or more available data repositories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:
1. A method, by a processor, for providing an enhanced codebase in a computing environment, comprising:

receiving training data containing a codebase with a container specification file from one or more public repositories,
wherein the one or more public repositories each comprise a repository containing a Dockerrfile;
executing machine learning logic to train, utilizing the training data, both first model comprising a container specification candidate file generator model and
a second model comprising a codebase attribute value predictor model; and
automatically generating one or more container specification files for the codebase based on one or more extracted attribute names and values determined according to an output of the first model and the second model;
including predicting one or more attribute values for one or more intermediate container specification files.

2. The method of claim 1, further including automatically generating one or more intermediate container specification files for the codebase from one or more available data repositories.

3. The method of claim 1, further including identifying and extracting attribute names and values from one or more intermediate container specification files.

4. The method of claim 1, further including refining one or more intermediate container specification files using one or more predicted attribute values.

5. The method of claim 1, further including receiving feedback data to correct or amend the one or more container specification files.

6. A system for providing an enhanced codebase in a computing environment, comprising: one or more computers with executable instructions that when executed cause the system to:
receive training data containing a codebase with a container specification file from one or more public repositories, wherein the one or more public repositories each comprise a repository containing a Dockerfile;
execute machine learning logic to train, utilizing the training data, both first model comprising a container specification candidate file generator model and
a second model comprising a codebase attribute value predictor model; and
automatically generate one or more container specification files for the codebase based on one or more extracted attribute names and values determined according to an output of the first model and the second model;
including predicting one or more attribute values for one or more intermediate container specification files.

7. The system of claim 6, wherein the executable instructions that when executed cause the system to automatically generate one or more intermediate container specification files for the codebase from one or more available data repositories.

8. The system of claim 6, wherein the executable instructions that when executed cause the system to identify and extract attribute names and values from one or more intermediate container specification files.

9. The system of claim 6, wherein the executable instructions that when executed cause the system to refine one or more intermediate container specification files using one or more predicted attribute values.

10. The system of claim 6, wherein the executable instructions that when executed cause the system to receive feedback data to correct or amend the one or more container specification files.

11. A computer program product for providing an enhanced codebase in a computing environment, the computer program product comprising:
one or more computer readable storage media, and program instructions collectively stored on the one or more computer readable storage media, the program instruction comprising:
program instructions to receive training data containing a codebase with a container specification file from one or more public repositories, wherein the one or more public repositories each comprise a repository containing a Dockerfile;
program instructions to execute machine learning logic to train, utilizing the training data, both first model comprising a container specification candidate file generator model and
a second model comprising a codebase attribute value predictor model; and
program instructions to automatically generate one or more container specification files for the codebase based on one or more extracted attribute names and values determined according to an output of the first model and the second model;
including predicting one or more attribute values for one or more intermediate container specification files.

12. The computer program product of claim 11, further including program instructions to automatically generate one or more intermediate container specification files for the codebase from one or more available data repositories.

13. The computer program product of claim 11, further including program instructions to:
predict one or more attribute values for one or more intermediate container specification files; and
refine the one or more intermediate container specification files using the one or more predicted attribute values.

14. The computer program product of claim 11, further including program instructions to receive feedback data to correct or amend the one or more container specification files.

* * * * *